(12) United States Patent
Ojala

(10) Patent No.: US 12,456,867 B2
(45) Date of Patent: Oct. 28, 2025

(54) ELECTRICAL SYSTEMS AND METHODS USING HIGH CAPACITY LOCAL BUS SUPPORTED BY ENERGY STORAGE

(71) Applicant: FlexGen Power Systems, LLC, Durham, NC (US)

(72) Inventor: Davin Ojala, Durham, NC (US)

(73) Assignee: FlexGen Power Systems, LLC, Durham, NC (US)

( * ) Notice: Subject to any disclaimer, the term of this patent is extended or adjusted under 35 U.S.C. 154(b) by 569 days.

(21) Appl. No.: 17/934,229

(22) Filed: Sep. 22, 2022

(65) Prior Publication Data

US 2023/0088380 A1 Mar. 23, 2023

Related U.S. Application Data

(60) Provisional application No. 63/246,984, filed on Sep. 22, 2021.

(51) Int. Cl.
*H02J 3/38* (2006.01)
*H02J 3/32* (2006.01)
*H02J 7/00* (2006.01)

(52) U.S. Cl.
CPC ............... *H02J 3/381* (2013.01); *H02J 3/32* (2013.01); *H02J 7/0013* (2013.01)

(58) Field of Classification Search
CPC .. H02J 3/381; H02J 3/32; H02J 7/0013; H02J 2310/12
See application file for complete search history.

(56) References Cited

U.S. PATENT DOCUMENTS

| | | | | |
|---|---|---|---|---|
| 7,141,892 B2* | 11/2006 | Dai | ........................ | H02J 9/062 307/64 |
| 2004/0036361 A1* | 2/2004 | Dai | ..................... | H02M 5/4585 307/64 |
| 2004/0264089 A1* | 12/2004 | Furuya | ...................... | H02J 3/38 361/92 |
| 2005/0151517 A1* | 7/2005 | Cook | ........................ | H02J 1/08 323/207 |

(Continued)

FOREIGN PATENT DOCUMENTS

CN 108092315 A 5/2018

OTHER PUBLICATIONS

International Search Report and Written Opinion; International App. No. PCT/US2022/076827; mailing date Dec. 16, 2022, 13 pages.

(Continued)

*Primary Examiner* — Daniel Kessie
*Assistant Examiner* — Brian K Baxter
(74) *Attorney, Agent, or Firm* — Stanek Lemon Crouse & Meeks, PA

(57) ABSTRACT

A system includes a first bus configured to be coupled to a grid and a second bus configured to be coupled to a load and/or a source. A first converter is configured to couple the first bus and the second bus and a second converter configured to couple an energy storage device to the second bus. The system further includes a controller configured to control the first and second converters such that the second converter controls a voltage and frequency on the second bus by energy transfer between the energy storage device and the second bus and the first converter transfers energy between the first bus and the second bus.

13 Claims, 2 Drawing Sheets

(56) References Cited

U.S. PATENT DOCUMENTS

| | | | | |
|---|---|---|---|---|
| 2007/0159858 A1* | 7/2007 | Spindler | ................... | H02J 3/32 |
| | | | | 363/37 |
| 2010/0001585 A1* | 1/2010 | Nagata | ................... | H02J 3/003 |
| | | | | 307/24 |
| 2010/0023174 A1* | 1/2010 | Nagata | ................. | G05B 13/027 |
| | | | | 700/287 |
| 2011/0278931 A1* | 11/2011 | Johnson, Jr. | ............ | H02J 3/381 |
| | | | | 307/66 |
| 2011/0278933 A1* | 11/2011 | Anderson | ............... | H02J 9/062 |
| | | | | 307/66 |
| 2012/0257429 A1* | 10/2012 | Dong | ...................... | H02M 7/48 |
| | | | | 363/127 |
| 2013/0264865 A1* | 10/2013 | Sugeno | ................... | H02J 3/322 |
| | | | | 307/19 |
| 2014/0049865 A1* | 2/2014 | Dougal | ................... | H02H 3/06 |
| | | | | 361/71 |
| 2015/0270744 A1* | 9/2015 | Lacarnoy | ................ | H02J 9/061 |
| | | | | 307/66 |
| 2016/0329713 A1 | 11/2016 | Berard | | |
| 2017/0005473 A1 | 1/2017 | Somani et al. | | |
| 2017/0033561 A1* | 2/2017 | Lim | ...................... | H02J 7/0068 |
| 2017/0149244 A1* | 5/2017 | Recio | ........................ | H02J 3/16 |
| 2017/0317501 A1* | 11/2017 | Moriyama | .............. | H02J 3/381 |
| 2017/0358987 A1* | 12/2017 | Oouchi | ................... | B60L 53/22 |
| 2018/0323619 A1* | 11/2018 | Ganireddy | .............. | H02J 3/381 |
| 2019/0052092 A1* | 2/2019 | Palombini | ................. | H02J 3/32 |
| 2019/0214827 A1* | 7/2019 | Johnson, Jr. | ............... | H02J 3/40 |
| 2019/0379269 A1* | 12/2019 | Huntgeburth | ...... | H05K 7/20145 |
| 2020/0274364 A1* | 8/2020 | Kumar | ...................... | H02J 3/32 |
| 2021/0194275 A1* | 6/2021 | Lee | ........................... | H02J 3/32 |
| 2021/0242713 A1* | 8/2021 | Gonzalez | .............. | H02M 5/458 |
| 2021/0288492 A1* | 9/2021 | Rixhon | ..................... | H02J 3/36 |
| 2022/0190637 A1* | 6/2022 | Shigeta | ..................... | H02J 7/02 |
| 2022/0224149 A1* | 7/2022 | Colombi | ................. | H02J 9/061 |
| 2022/0247175 A1* | 8/2022 | Ganger | .................. | H02J 3/388 |

OTHER PUBLICATIONS

Shan et al; A Seamless Operation Mode Transition Control Strategy for a Microgrid Based on Master-Slave Control; Proceedings of the 31st Chinese Control Conferences; Jul. 25-27, 2012; pp. 6768-6775.

* cited by examiner

ELECTRICAL SYSTEMS AND METHODS USING HIGH CAPACITY LOCAL BUS SUPPORTED BY ENERGY STORAGE

RELATED APPLICATIONS

The present application claims priority to U.S. Provisional Patent Application Ser. No. 63/246,984, entitled ELECTRICAL SYSTEMS AND METHODS USING HIGH CAPACITY LOCAL BUS SUPPORTED BY ENERGY STORAGE, filed Sep. 22, 2021, the disclosure of which is incorporated herein by reference in its entirety.

BACKGROUND

The inventive subject matter relates to electrical power systems and methods and, more particularly, to systems and methods for linking local and grid-derived buses.

In an electrical distribution system within a building or other premises, the frequency, voltage, and power capacity are typically determined by the connection between a local bus in the building and a utility grid that feeds the local bus. This may limit peak power of loads connected to the local bus, even if the loads have average power consumption below the capacity of the connection to the grid.

SUMMARY

According to some embodiments, a system includes a first bus configured to be coupled to a grid and a second bus configured to be coupled to a load and/or a source. A first converter is configured to couple the first bus and the second bus and a second converter configured to couple an energy storage device to the second bus. The system further includes a controller configured to control the first and second converters such that the second converter controls a voltage and frequency on the second bus by energy transfer between the energy storage device and the second bus and the first converter transfers energy between the first bus and the second bus.

According to some embodiments, the controller may be configured to control the first and second converters to provide a first mode wherein the second converter controls a voltage and frequency of the second bus while the first converter is inactive, a second mode wherein the second converter controls the voltage and frequency of the second bus while the first converter supplies power to or extracts power from the second bus, and a third mode wherein the first bus is connected directly to the second bus, the first converter is inactive and the second converter operates in a grid following mode.

In further embodiments, the controller may be configured to cause the second converter to transfer power from the energy storage device to the second bus to support a peak draw of devices connected to the second bus and to transfer power from the second bus to the energy storage device to support a peak output of the devices connected to the second bus. The second converter and the energy storage device may be sized to support peak power levels and the first converter is sized to support an average power level.

In some embodiments, the devices connected to the second bus may include at least one battery tester coupling at least one battery to the second bus and configured to transfer power between the second bus and the at least one battery.

In further embodiments, a system includes a first bus configured to be coupled to a grid, a second bus configured to be coupled to a load and/or a source, an energy storage device, a first converter configured to couple the first bus and the second bus, and a second converter configured to couple the energy storage device to the second bus. The system further includes a controller configured to control the first and second converters to provide a first mode wherein the second converter controls a voltage and frequency of the second bus while the first converter is inactive, a second mode wherein the second converter controls the voltage and frequency of the second bus while the first converter supplies power to or extracts power from the second bus, and a third mode wherein the first bus is connected directly to the second bus, the first converter is inactive and the second converter operates in a grid following mode.

Some embodiments provide methods of operating a system including a first bus configured to be coupled to a grid, a second bus configured to be coupled to a load and/or a source, an energy storage device, a first converter configured to couple the first bus and the second bus and a second converter configured to couple the energy storage device to the second bus. The methods include controlling the first and second converters such that the second converter controls a voltage and frequency on the second bus by energy transfer between the energy storage device and the second bus and the first converter transfers energy between the first bus and the second bus. The methods may further includes controlling the first and second converters to provide a first mode wherein the second converter controls a voltage and frequency of the second bus while the first converter is inactive, a second mode wherein the second converter controls the voltage and frequency of the second bus while the first converter supplies power to or extracts power from the second bus, and a third mode wherein the first bus is connected directly to the second bus, the first converter is inactive and the second converter operates in a grid following mode.

DETAILED DESCRIPTION

Figure 1:
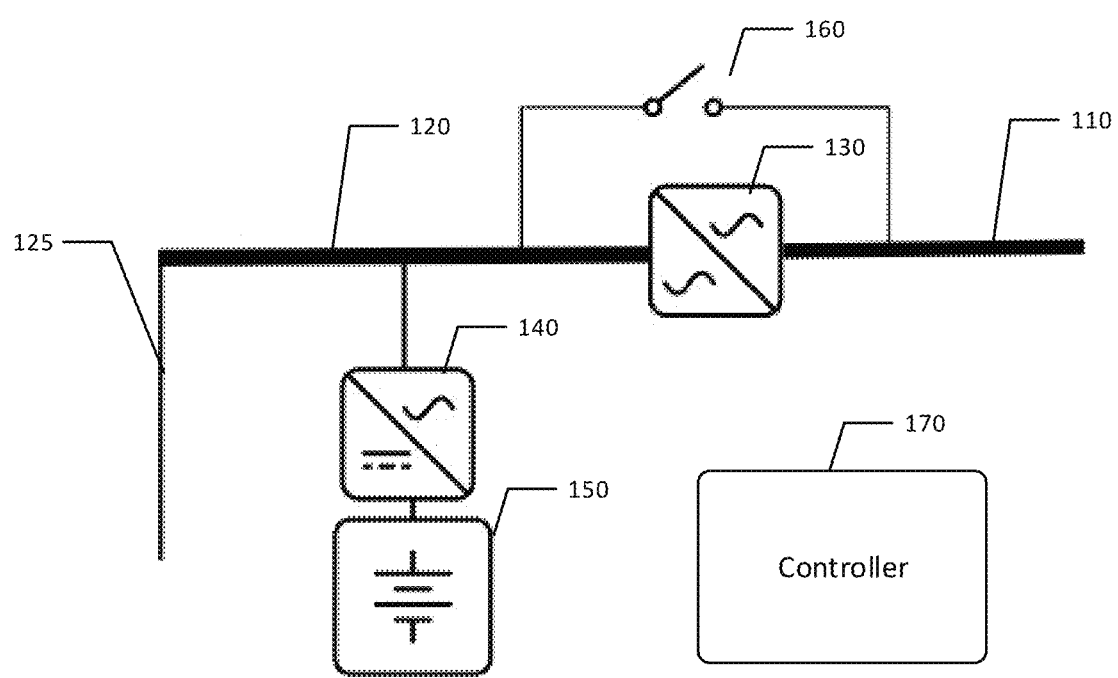
FIG. 1 is a schematic diagram of a power system according to some embodiments of the inventive subject matter.

The inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

In a typical customer-side AC electrical distribution system, such as an electrical distribution system within a building, the frequency, voltage, and power capacity of the customer system may be limited by the capacity of the connection of the system to the grid. Some embodiments of the inventive subject matter can provide an AC electrical system which is capable of exchanging power and energy between AC buses that have different frequencies, voltages, phase angles and/or power flows. Such systems may serve electrical loads and sources, such as loads and sources that have relatively high peak current demands, that might not be safely, reliably, or economically served using a conventional connection to the grid. Some embodiments use power converters and energy storage to create a system bus that can operate out of synchronicity with an existing grid-connected bus and support higher power loads.

FIG. 1 illustrates a system according to some embodiments. A first bus 110 may be a supply bus, e.g., a bus that is connected directly or indirectly (e.g., via a transformer and/or switchgear) to a utility grid. A second bus 120 is configured to be connected to loads and/or sources by at least one feeder 125. The first bus 110 is connected to the second bus 120 by a first power converter 130. The voltage and frequency of the second bus 120 may be regulated by a second power converter 140, which couples an energy storage device 150 to the second bus 120.

The first power converter 130 is an AC to AC power converter capable of exchanging power between the first and second buses 110, 120. The first power converter 130 may include, for example, back-to-back inverters connected by a DC link, wherein one inverter operates as an active rectifier controlling the DC link voltage and the other inverter operates in a grid-connected power control mode. The second power converter 140 may be an inverter capable of operating in voltage and frequency control mode. The energy storage device 150 may include some form of electrochemical energy storage, including but not limited to, lithium-ion batteries, lead-acid batteries and/or ultracapacitors (e.g., electric double-layer capacitors). A controller 170 may obtain information from the first and second power converters 130, 140 and the energy storage device 150 and send commands to the first and second power converters 130, 140 to control power flows via the first and second power converters 130,140. The system may also include a bypass switch 160 operable to bypass the first power converter 130 and directly connect the first and second buses 110, 120.

The controller 170 may operate the converters 130, 140 and the bypass switch to support at least three modes of operation. In an islanded mode, the second converter 140 operates in a voltage and frequency control mode wherein the second converter 140 controls the voltage and frequency of the second bus 120. The first converter 130 is inactive and the bypass switch 160 is open, thus decoupling the first bus 110 from the second bus 120. In this mode, power flows to or from the feeder 125 are supplied or absorbed by the energy storage device 150.

In a power coupled mode, the second converter 140 operates in a voltage and frequency control mode in which the second converter 140 controls the voltage and frequency of the second bus 120, while the first converter 130 is used to supply power to or extract power from the second bus 120 to, for example, compensate for consumption by loads connected to the feeder 125 or losses in the system or production of excess power generated by one or more sources connected to the feeder 125. In this mode, the first bus 110 is energized and the bypass switch 160 is open, and power flows to or from the feeder 125 are supplied or absorbed by the energy storage device 150 and/or the first converter 130. The controller 170 may, for example, control the first converter 130 to facilitate power flows between the first bus 110 and the second bus 120 to, for example, provide power to charge the energy storage device 150 to make up for consumption by loads on the feeder 125 or losses in the system.

In a connected mode, the bypass switch 160 is closed, the first converter 130 is inactive, and the second converter 140 operates in a grid following power control mode, i.e., a mode wherein the second converter 140 synchronizes the voltage on the second bus 110 with the voltage on the first bus 110. The controller 170 may provide the second converter 140 with power set points for the purpose of controlling or limiting the power flows between the first and second buses 110, 120.

In various applications, embodiments of the inventive subject matter can increase reliability. In particular, if the first bus 110 tends to experience intermittent de-energization, the system can be used to provide a steady source for loads connected to the feeder 125, as the voltage at the second bus 120 is generally not affected by the voltage at the first bus 110. The system can also enhance power quality provided to loads coupled to the second bus 120. If the first bus 110 has poor power quality, the system can be used to provide a high-quality source at the second bus 120 while still using the first bus 110 as a source of power.

The system can also be used to overcome capacity limitations of the first bus 110. In cases in which the first bus 110 cannot support the peak draw or output of devices connected to the second bus 120, the system can be used to provide or absorb additional power using the energy storage device 150. The second converter 140 and the energy storage device 150 can be sized to support peak power levels, while the first converter 130 may be sized to support an average power level.

According to further aspects, the controller 170 can cause the first converter 130 to regulate energy transfer between the first bus 110 and the second bus 120 based on the state of charge of the energy storage device 150 and/or a demand or generation from the second bus 120. For example, the controller 170 may regulate energy transfer between the first bus 110 and the second bus 120 based on a state of charge of the energy storage device 150 and/or a demand or generation from the second bus 120. The energy transfer may be regulated based on anticipated demand or generation from the second bus 120.

Figure 2:
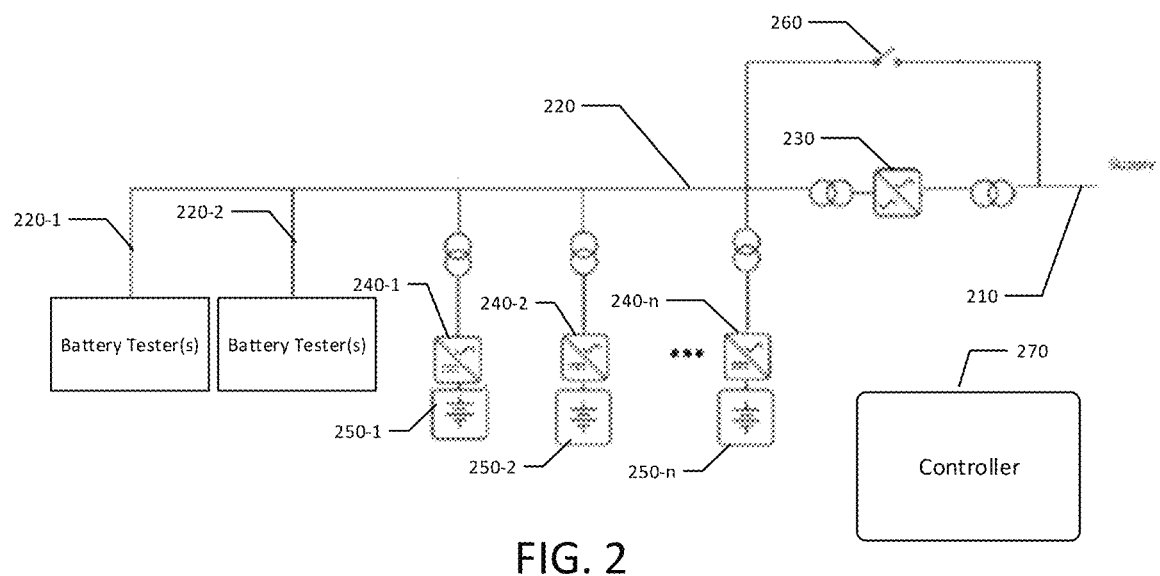
FIG. 2 illustrates a system for battery testing according to further embodiments.

FIG. 2 illustrates a representative application of such a system in a facility that is used to test batteries. The system of FIG. 2 includes a supply bus 210 which is coupled to a local bus 220 by a first converter 230, e.g., an AC/AC converter along the lines discussed above. A bypass switch 260 is configured to bypass the first converter 230. Plural batteries 250-1, 250-2, . . . , 250-n are coupled to the local bus 220 by respective second converters 240-1, 240-2, . . . , 240-n. Feeds 220-1, 220-2 are provided for connection of sources and/or loads to the local bus 220. A controller 270 is configured to monitor the supply and local buses 210, 220, the first converter 230, the second converters 240-1, 240-2, . . . , 240-n, and the batteries 250-1, 250-2, . . . , 250-n, and to responsively control the first converter 230, the second converters 240-1, 240-2, . . . , 240-n, and the bypass switch 260.

Multiple battery testers coupled to feeds 220-1, 220-2 test batteries using a regenerative scheme in which power is taken from and returned to the local bus 220. Along the lines described above, in an islanded mode, the local bus 220 may be isolated from the supply bus 210 and the second converters 240-1, 240-2, . . . , 240-n operated to maintain a desired voltage and frequency on the local bus 220 as the battery testers draw power from and return power to the local bus 220. In a power coupled mode, the second converters 240-1, 240-2, . . . , 240-n can similarly maintain a desired voltage and frequency on the local bus 220 while the first converter 230 may be used to transfer energy between the supply bus 210 and the local bus 220. Potential advantages of the arrangement shown in FIG. 2 include a capability to maintain operation of the battery testers if power at the supply bus 210 is intermittently absent or otherwise of poor quality and a capability to support relatively large energy transfers to and from the local bus 220 to support the battery testers while limiting peak currents at the supply bus 210.

In this specification, there have been disclosed embodiments of the inventive subject matter and, although specific terms are employed, they are used in a generic and descriptive sense only and not for purposes of limitation.

The invention claimed is:

1. A system comprising:
   a first bus configured to be coupled to a grid;
   a second bus configured to be coupled to a load and/or a source;
   an energy storage device;
   a first converter configured to couple the first bus and the second bus;
   a second converter configured to couple the energy storage device to the second bus; and
   a controller configured to control the first and second converters such that the second converter controls a voltage and frequency on the second bus by energy transfer between the energy storage device while the second bus and the first converter transfers energy between the first bus and the second bus;
   wherein the controller is configured to control the first and second converters to provide the following modes:
      a first mode wherein the second converter controls the voltage and frequency of the second bus while the first converter is inactive; and
      a second mode wherein the second converter controls the voltage and frequency of the second bus while the first converter supplies power to or extracts power from the second bus.

2. The system of claim 1, wherein the controller causes the second converter to transfer power from the energy storage device to the second bus to support a peak draw of devices connected to the second bus and to transfer power from the second bus to the energy storage device to support a peak output of the devices connected to the second bus.

3. The system of claim 2, wherein the devices connected to the second bus comprise at least one device configured to support bidirectional power flows to and from the second bus.

4. The system of claim 1, wherein the second converter and the energy storage device are sized to support peak power levels and the first converter is sized to support an average power level.

5. The system of claim 1, wherein the controller is configured to operate the first and second converters to regulate energy transfer between the first and second buses based on a state of the energy storage device and/or a load or generation on the second bus.

6. A system comprising:
   a first bus configured to be coupled to a grid;
   a second bus configured to be coupled to a load and/or a source;
   an energy storage device;
   a first converter configured to couple the first bus and the second bus;
   a second converter configured to couple the energy storage device to the second bus;
   a bypass switch configured to connect the first bus and the second bus to bypass the first converter; and
   a controller configured to control the first and second converters and the bypass switch to provide the following modes:
      a first mode wherein the second converter controls a voltage and frequency of the second bus while the first converter is inactive;
      a second mode wherein the second converter controls the voltage and frequency of the second bus while the first converter supplies power to or extracts power from the second bus; and
      a third mode wherein the first bus is connected directly to the second bus, the first converter is inactive and the second converter operates in a grid following mode.

7. The system of claim 6, wherein the controller causes the second converter to transfer power from the energy storage device to the second bus to support a peak draw of devices connected to the second bus and to transfer power from the second bus to the energy storage device to support a peak output of the devices connected to the second bus.

8. The system of claim 7, wherein the devices connected to the second bus comprise at least one device configured to support bidirectional power flows to and from the second bus.

9. The system of claim 7, wherein the second converter and the energy storage device are sized to support peak power levels and the first converter is sized to support an average power level.

10. A method of operating a system comprising a first bus configured to be coupled to a grid, a second bus configured to be coupled to a load and/or a source, an energy storage device, a first converter configured to couple the first bus and the second bus, and a second converter configured to couple the energy storage device to the second bus, the method comprising:
   controlling the first and second converters such that the second converter controls a voltage and frequency on the second bus by energy transfer between the energy storage device and the second bus while the first converter transfers energy between the first bus and the second bus;
   further comprising controlling the first and second converters to provide the following modes:

a first mode wherein the second converter controls a voltage and frequency of the second bus while the first converter is inactive;

a second mode wherein the second converter controls the voltage and frequency of the second bus while the first converter supplies power to or extracts power from the second bus; and a third mode wherein the first bus is connected directly to the second bus, the first converter is inactive and the second converter operates in a grid following mode.

11. The method of claim 10, further comprising the second converter transferring power from the energy storage device to the second bus to support a peak draw of devices connected to the second bus and transferring power from the second bus to the energy storage device to support a peak output of the devices connected to the second bus.

12. The method of claim 11, wherein the second converter and the energy storage device are sized to support peak power levels and the first converter is sized to support an average power level.

13. The method of claim 11, wherein the devices connected to the second bus comprise at least one battery tester coupling at least one battery to the second bus and configured to transfer power between the second bus and the at least one battery.

* * * * *